(12) United States Patent
Jang et al.

(10) Patent No.: US 6,683,666 B1
(45) Date of Patent: Jan. 27, 2004

(54) REFLECTIVE-TRANSMISSION TYPE THIN FILM TRANSISTOR LIQUID CRYSTAL DISPLAY

(75) Inventors: Yong-Kyu Jang, Kyongki-do (KR); Young-Kuil Joo, Kyunggi-do (KR); Myeon-Koo Kang, Seoul (KR)

(73) Assignee: Samsung Electronics Co., Ltd., Suwon (KR)

(*) Notice: Subject to any disclaimer, the term of this patent is extended or adjusted under 35 U.S.C. 154(b) by 198 days.

(21) Appl. No.: 09/709,312

(22) Filed: Nov. 13, 2000

(30) Foreign Application Priority Data

Nov. 11, 1999 (KR) .......................................... 1999-49940
Mar. 8, 2000 (KR) .......................................... 2000-11533

(51) Int. Cl.$^7$ ............................................. G02F 1/1335
(52) U.S. Cl. ........................ 349/113; 349/42; 349/187; 438/30

(58) Field of Search .................................. 349/113, 42

(56) References Cited

U.S. PATENT DOCUMENTS 6,195,140 B1 * 2/2001 Kubo et al. .................... 349/44
6,330,047 B1 * 12/2001 Kubo et al. ................. 349/147

* cited by examiner

Primary Examiner—Robert H. Kim
Assistant Examiner—P. R. Akkapeddi
(74) Attorney, Agent, or Firm—McGuireWoods LLP (57) ABSTRACT

The present invention provide a reflective transmission type TFT LCD wherein each of the reflective pixel electrode and the transmissive pixel electrode is connected directly to a source electrode of a thin film transistor, or the transmissive pixel electrode are concurrently formed with gate electrode and made with double layer of transparent conduction layer and metal layer which can be used as parameter conduction layer between the transparent conduction layer and the reflective pixel electrode.

52 Claims, 10 Drawing Sheets

REFLECTIVE-TRANSMISSION TYPE THIN FILM TRANSISTOR LIQUID CRYSTAL DISPLAY

FIELD OF THE INVENTION

The present invention is related to reflective-transmission type thin film transistor liquid crystal display and more specifically related to liquid crystal display wherein the reflective pixel electrode and transmissive pixel electrode composing the whole pixel electrode can be stably connected with the source electrode of thin film transistor which controls a pixel.

Background of the Invention

Liquid crystal displays can be classified to many numerous types according to the methods of manufacturing and the structures. For example, top gate type and bottom gate type can be deferentiated. For the manufacturing of top gate type LCD, active layer made with semiconductor material is formed before gate insulating layer and gate pattern are formed. But, in case of bottom gate type LCD, the gate pattern and the gate insulating layer is formed prior to the active layer.

On the other hand, the classification of reflective type and transmissive type can be possible. In the transmissive type LCD, the pixel electrode is made with reflective material like metals which reflect light from external environment. But, in the reflective type LCD, the pixel electrode is made with transparent conductive materials containing indium metal oxide lineage like ITO (indium tin oxide). In the transmissive type LCD, independent light source is placed at the backside of LCD panel and thus called backlight, and various colorful images can be presented by controlling the state of liquid crystal of numerous pixels to transmit or to shied the light from the backlight.

Recently, reflective type LCD is considered as an alternative in notebook LCD which need large display size and high quality image. And reflective-transmission type LCD which has merits of both reflective type and transmission type is also presented by SHARP(registered trade mark).

In the reflective transmission type LCD of SHARP, transmissive pixel electrode is formed to be connected to source electrode of thin film transistor in the process of making thin film transistor on glass substrate. And passivasion layer which has contact hole in the source region of the thin film transistor is formed on the thin film transistor. Then, reflective metal layer like aluminum is formed on the passivation layer and patterned to confine the reflective area and to form a window which reveals some part of transmissive layer. Here, the patterned reflective metal, the reflective pixel electrode is connected to the source electrode through the contact hole.

Meanwhile, in the process of fabricating the reflective transmission type LCD, some problems can be caused according to the materials adopted as transmissive pixel electrode and reflective pixel electrode. For example, if the reflective pixel electrode made with aluminum, is electrically connected with the source electrode by the transmissive pixel electrode which covers the source electrode. But, the transmissive pixel electrode is made with ITO (indium tin oxide) generally used as transparent conduction layer, an oxide insulation layer is to be formed between the reflective pixel electrode and transmissive pixel electrode. Then, the oxide layer prevents the enhancement of electric field to the reflective pixel electrode.

To avoid the problem, a parameter conduction layer can be used at the interface of the two problematic electrode materials. Also, the two problematic pixel electrode may be connected to the source electrode at different positions to prevent the problem. However, compared with the relatively large pixel electrode area, the region of the source electrode is confined to relatively small area, which makes it difficult to design and to form the transmissive area and the reflective area properly and simply.

SUMMARY OF THE INVENTION

It is therefore an object of the present invention to provide a reflective transmission type TFT LCD wherein the stable operation of whole pixel electrode and safe enhancement of electric potential to whole pixel electrode can be confirmed.

It is another object of the present invention to provide a reflective transmission type TFT LCD wherein the easiness and simplicity can be sustained in the process of is forming the whole pixel electrode.

In order to obtain the above mentioned and other objects, the present invention provide a reflective transmission type TFT LCD wherein each of the reflective pixel electrode and the transmissive pixel electrode is connected directly to a source electrode of a thin film transistor, or the transmissive pixel electrode are concurrently formed with gate electrode and made with double layer of transparent conduction layer and metal layer which can be used as parameter conduction layer between the transparent conduction layer and the reflective pixel electrode.

According to one aspect of the present invention, the reflective transmission type thin film transistor liquid crystal display (TFT LCD) comprises a glass substrate, at least one thin film transistor on the substrate for controlling a pixel, passivation layer having at least one contact hole in a source region of the thin film transistor, a transmissive pixel electrode which is formed on the passivation layer and is connected with a source electrode of the source region through a contact hole, a reflective pixel electrode which is formed on the passivation layer and is connected with the source electrode of the source region through a contact hole. And the pixel area is composed of a transparent area in which only the transmissive pixel electrode of whole pixel electrode exist and a reflective area in which the reflective pixel electrode exist.

Here, it is obvious to those who are skilled in the art that the structure of thin film transistor can be varied according to the method of fabrication.

Here, for the prevention of defective chemical reaction among the reflective layer, the transmissive layer and the etchant in the process of etching or cleaning, the reflective transmission type thin film transistor liquid crystal display may have a separating insulator layer which have good transparency between the transmissive pixel electrode and the reflective pixel electrode.

If the number of contact hole is one, the transmissive pixel electrode (in case of comprising the separating insulator, the separating insulator also) have a hole revealing some part of the source region and the reflective pixel electrode which is formed over the transmissive pixel electrode is connected with the source electrode of the part of the source region via the hole.

In case that the number of contact hole is two, one is for the transmissive pixel electrode and the other is for the transmissive pixel electrode, in the region of the other contact hole, the transmissive pixel electrode (in case of having a separating insulator, the separating insulator also)

has a hole revealing the source electrode for a connection between the reflective pixel electrode and the source electrode.

Here, the hole formed in the transparent conduction layer and in the separating insulator can be formed by sequential forming of the two layers and patterning of the two layers using one photo mask Generally, the width of the contact hole formed in the source region is far wider than the thickness of layers forming the pixel electrode, the removal of some part of the transmissive conductor layer and the separating insulatior at the contact hole can be executed in the patterning.

In the present invention, the reflective pixel electrode may be made with metals including aluminum and the transmissive pixel electrode may be made with indium metal oxide lineage such as ITO, IZO.

Generally, the transparent area takes form and shape of window in the reflective area. And, the separating insulator can be removed for the efficiency of transmission of backlight by etching process wherein the reflective pixel electrode acts as an etching mask.

In the above explanation, for the efficiency of reflection, the transmissive pixel electrode are preferably formed before the reflective pixel electrode are formed. But, the sequence of forming the transmissive pixel electrode and forming the reflective pixel electrode can be changed with no significant change of effect.

According to another aspect of the present invention, the reflective transmission type thin film transistor liquid crystal display (TFT LCD) comprises a glass substrate, at least one thin film transistor on the substrate for controlling a pixel, a first type pixel electrode which is formed and patterned concurrently with gate of the thin film transistor, comprising upper non-oxidizing metal layer removed in transparent area and lower transparent conductor layer. It also comprises a passivation layer which is formed over the thin film transistor and over a first type pixel electrode. The passivation layer has a contact hole at a source region and a hole (or a window) in the transparent area and neighboring region (in a region including the transparent area). A second type pixel electrode which is formed over the passivation layer, is patterned to cover whole pixel area except the transparent window region, and is connected with a source electrode of the thin film transistor through the contact hole and connected with the non-oxidizing metal layer of the first type pixel electrode at the neighboring region.

Here, the passivation layer is preferably made with photosensitive transparent insulator and at least at some part the surface of the passivation layer is treated to take embossment which forms micro lens for focusing or integrating light. More preferably, the thickness of the passivation layer times the difference of refraction index corresponds to a quarter of wavelength of light in liquid crystal.

And the non-oxidizing metal can be one selected form the group consisting of chromium and tungsten-molybdenum.

BRIEF DESCRIPTION OF THE DRAWINGS

The other objects, features and advantages of the present invention will become apparent from the following description taken in conjunction with the accompanying drawings, in which.

DETAILED DESCRIPTION OF THE PREFERRED EMBODIMENT

The present invention will now be described hereinafter more fully with reference to the attached drawings, wherein preferred embodiment of the invention are shown. This invention may, however, be embodied in different forms and should not be construed as limited to the embodiments set forth herein. Rather, these embodiments are provided so that this disclosure will be through and complete, and will fully convey the scope of the invention to those skilled in the art.
(Embodiment 1)

Figure 1:
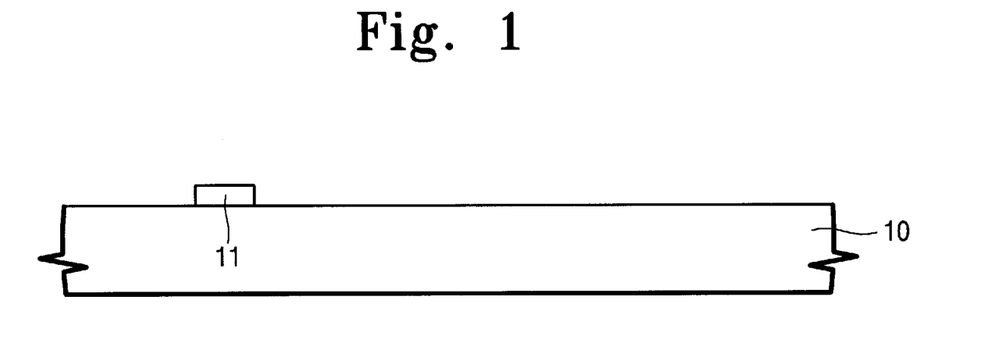
FIG. 1 to FIG. 7 are cross sectional views to selected stages of a method for forming an example according to one aspect of the present invention.
Figure 2:
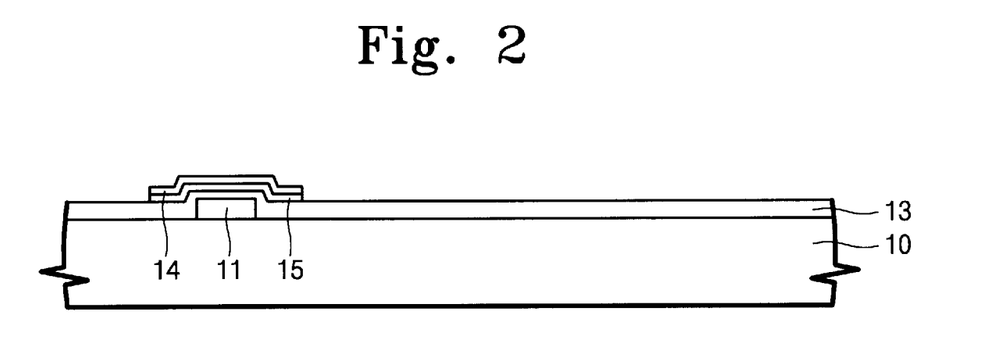
Figure 3:
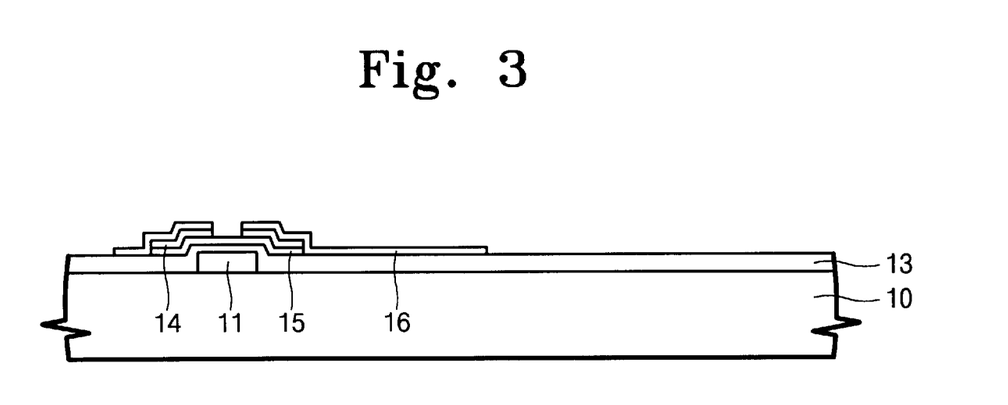

According to FIG. 1 to FIG. 3, gate electrode 11 is formed on a substrate 10. Gate insulating layer 13, active layer 15 made with amorphous silicon and Ohmmic contact layer 14 made with doped amorphous silicon are sequentially formed on the substrate 10 including the gate electrode 11. By patterning process, the Ohmmic contact layer 14 and active layer 15 are patterned to define active region. Then, metal layer is formed and patterned to shape a source electrode 16 and a drain electrode. In the patterning process, the Ohmmic contact layer and upper part of active layer 15 in the active region are also removed to make channel of a thin film transistor. As shown in FIG. 3, the source/drain electrode is larger than the source/drain region of the active region.

Figure 4:
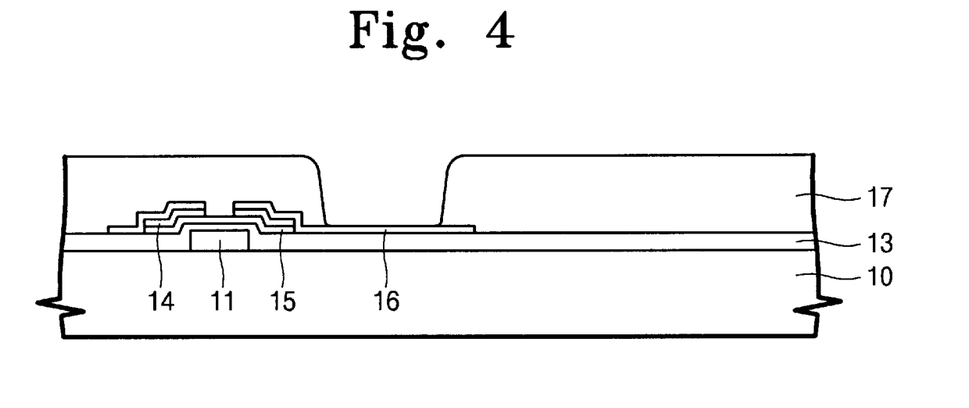

Referring to. FIG. 4, a passivation layer 17 made with insulating layer is formed on the source/drain electrode and patterned to form contact hole revealing some part of the source electrode 16.

Figure 5:
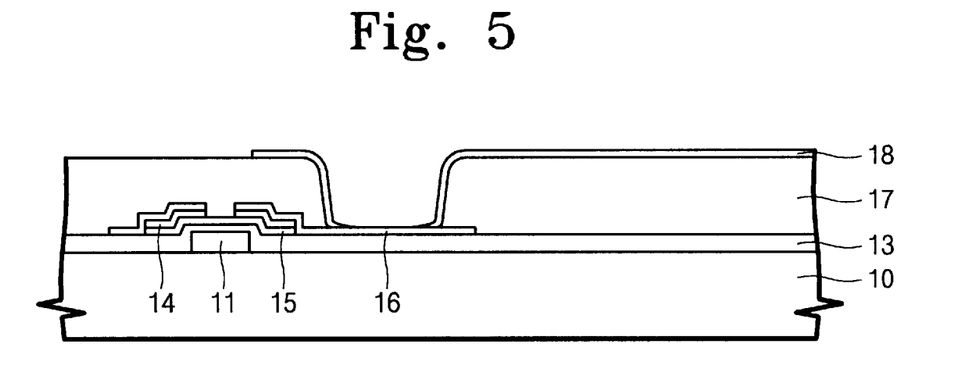

Referring to FIG. 5, on the passivation layer 17, a transmissive pixel electrode 18 is formed to cover a transparent area. The transmissive pixel electrode 18 can be made by depositing (including physical depositing) the transparent conduction layer like ITO and patterning the transparent conduction layer. In the patterning process, the transparent conduction layer is removed at some part of contact hole to make a hole revealing some part of the source electrode.

Figure 6:
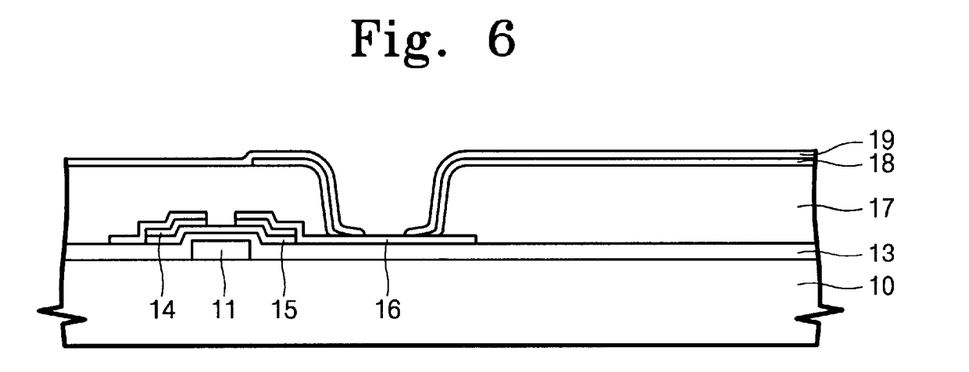
Figure 7:
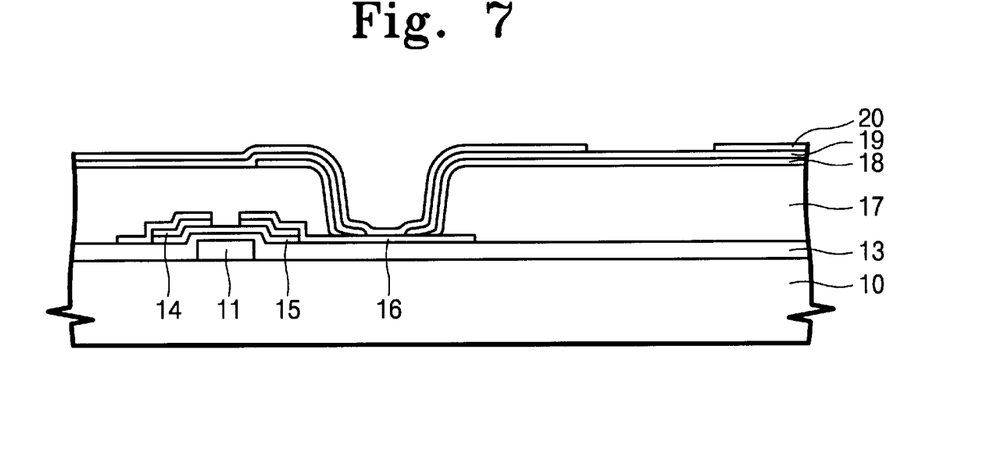

With regard to FIG. 6 and FIG. 7, separating insulator 19 made with silicon nitride is formed on the substrate including transmissive pixel electrode 18. In the separating insulator 19, a hole is formed to reveal the part of the source electrode 18. Accordingly, when the reflective conduction layer made with aluminum neodymium is deposited on the separating insulator 19, the reflective conduction layer is connected directly to the source electrode 18 through the hole formed in the separating insulator 19 and transmissive pixel electrode 18. Then, by patterning the reflective conduction layer, the reflective pixel electrode 20 having window through which the backlight is transmitted can be formed. For the efficiency of light transmission in the transparent area, the separating insulator can be removed in the window area by using the reflective pixel electrode 20 as an etching mask.

(Embodiment 2)

Figure 8:
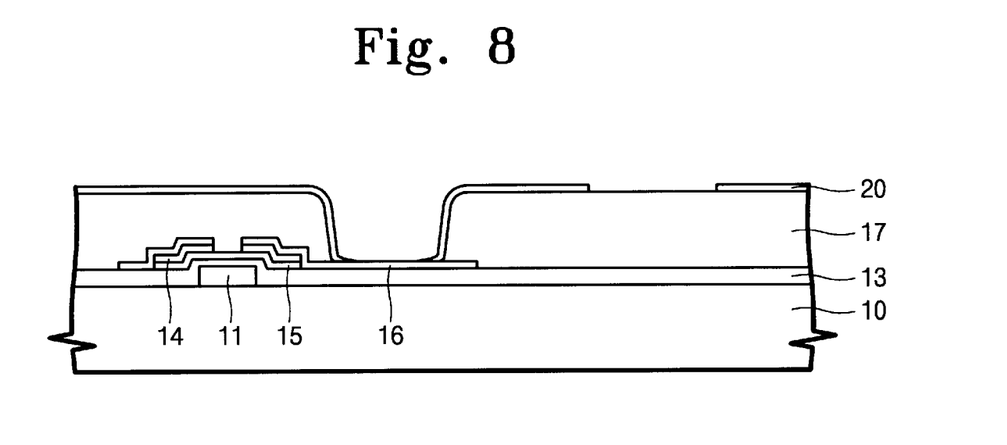
FIG. 8 and FIG. 9 are cross sectional views to selected stages of a method for forming other example of the aspect of the present invention.

According to FIG. 8, a structure of a thin film transistor and passivation layer 17 are formed on a substrate 10. Then, reflective conduction layer made with aluminum containing metal is formed first on the passivation layer 17 which has contact hole. Through the contact hole the reflective conduction layer is connected to the source electrode 16. By patterning the reflective conduction layer, reflective pixel electrode 20 having light transmission window is formed and concurrently a hole is formed at some part of the contact hole. Then, transparent conduction layer made with IZO is deposited (for the present invention, sputtering may be a type of physical deposition) and patterned to form a transmissive pixel electrode.

Figure 9:
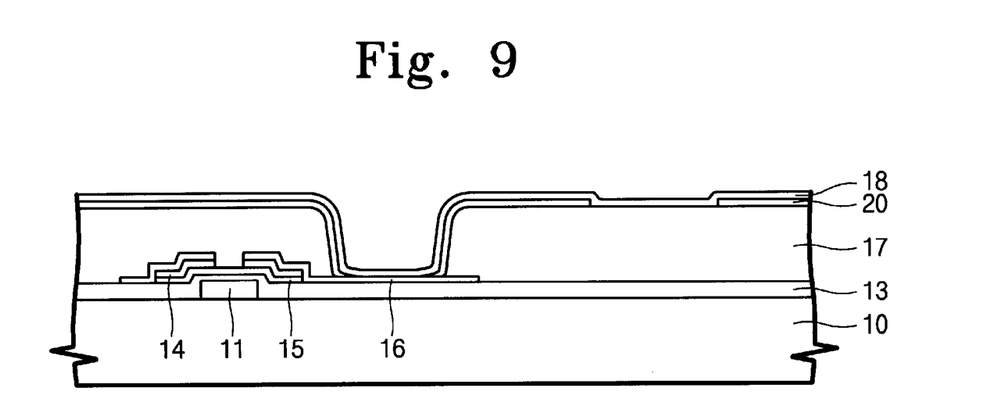

Compared with ITO layer, the IZO layer has less harmful reaction with aluminum containing metals at the interface. So, separating insulator can be omitted. However, if the sequence of forming reflective pixel electrode and forming transmissive pixel electrode is reversed, the IZO layer is to be damaged when the aluminum containing layer is patterned to form a light transmission window. Because the etching selectivity for the two layer is not so different.

(Embodiment 3)

Figure 10:
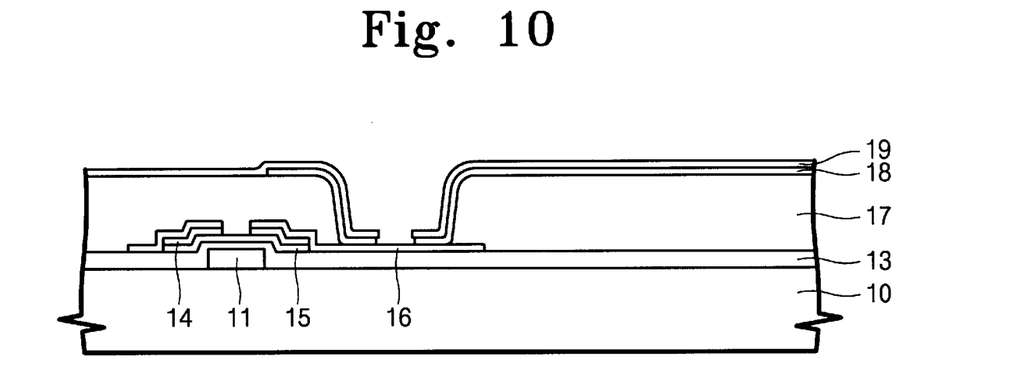
FIG. 10 and FIG. 11 are cross sectional views to selected stages of a method for forming another example of the aspect of the present invention.
Figure 11:
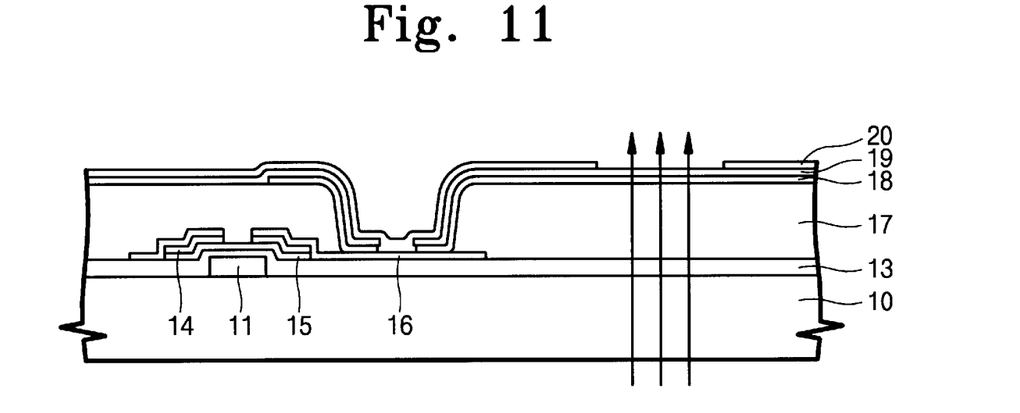

FIG. 10 and FIG. 11 show another embodiment that is slightly changed form the embodiment 1. In the embodiment 1, according to FIG. 5 And FIG. 6, the removal of transparent conduction layer and separating insulator layer in a contact hole region is made by individual patterning. However, in this embodiment, the hole formed in the transparent conduction layer and in the separating insulator layer is formed by sequential forming of the two layers and by patterning the two layers using one photo mask. Then, reflective pixel electrode 20 is formed. After the patterning of reflective conduction layer, the separating insulator 19 can be etched in the transparent window area for the improvement of efficiency of light transmission.

(Embodiment 4)

Figure 12:
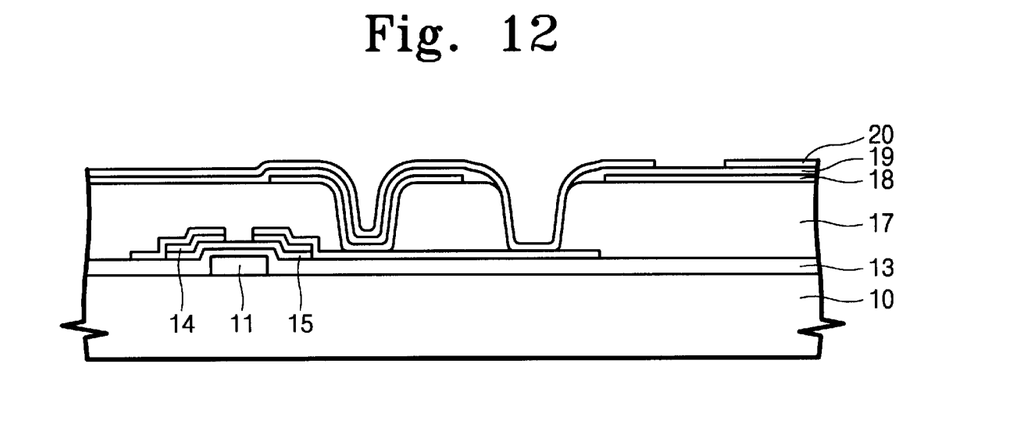
FIG. 12 shows a cross sectional view of a different example of the aspect of the present invention.

FIG. 12 shows another embodiment of the present invention. A source electrode is extended beyond the active region made with amorphous silicon layer. In the region of the source electrode 16, two contact holes are formed in a passivation layer 17 which covers the source electrode 16. Then, transmissive pixel electrode 18 made with ITO is formed on the passivation layer 17. Next, a separating insulator 19 made with silicon nitride or organic insulation material is formed on the transmissive pixel electrode 18 to cover the transmissive pixel electrode 18. In the process of forming, the transparent conduction layer and the separating insulator layer is removed at one contact hole region. And then, reflective conduction layer is formed on the separating insulator 19 and patterned to form a reflective pixel electrode 20 which has light transmission window. Thus, the transmissive pixel electrode 18 is connected to the source electrode 16 through the other contact hole. And the reflective pixel electrode 20 is connected to the source electrode 16 through the one contact hole.

Figure 13:
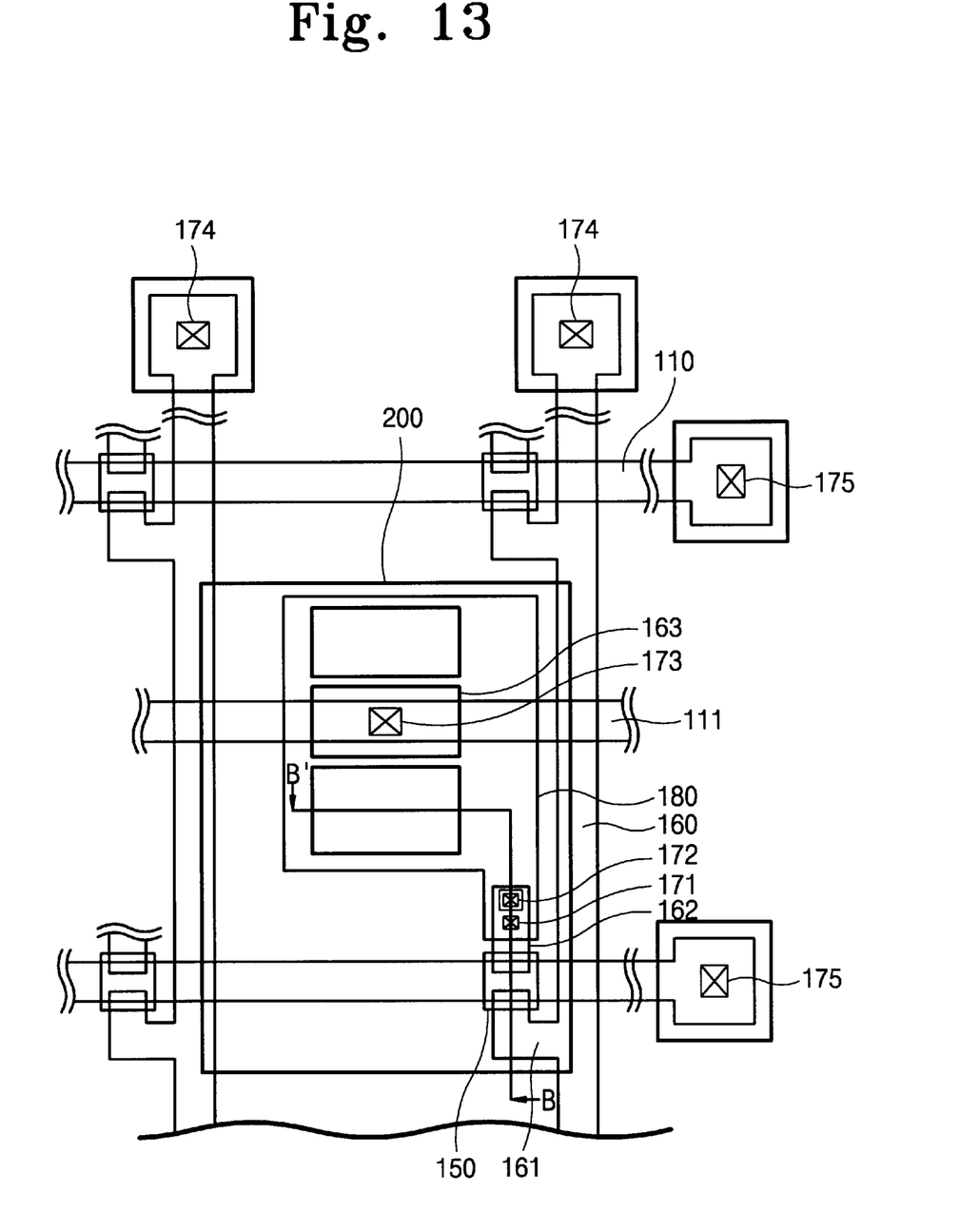
FIG. 13 shows a planar view of the example of FIG. 12.

FIG. 13 is a planar view to the embodiment shown in FIG. 12 and also can be a reference for the above described embodiments. In a source electrode region, there are two contacts through which pixel electrodes are individually connected to the source electrode. In the middle of a pixel region, two light transmission window 27 exist and form transparent area. Hereinafter more detailed description to the FIG. 13 regarding above mentioned embodiments will be made.

On a substrate like glass substrate, a gate line 110 including gate electrode is formed with metal layer like chromium. Concurrently, a capacitor line 111 is also formed with the same metal layer. Then, gate insulation layer such as silicon nitride layer is formed on the gate line 110 and the capacitor line 111. And active layer pattern 150 made with amorphous silicon and Ohmmic contact layer pattern made with N+ doped amorphous silicon is formed at least on the gate electrode. By depositing and patterning metal layer like chromium, titanium and molybdenum, a source electrode 162 and a drain electrode 161 which are connected with the Ohmmic contact layer pattern, data line 160 crossing with the gate line 110 and the capacitor line 111 and metal pattern 163 formed on the capacitor line 111 is made. The metal pattern 163 associated with the capacitor line 111 makes an effective means for acquiring capacitance.

Then, passivation layer is formed over the source electrode 162 and the drain electrode 161. Regarding to embodiment 4 shown in FIG. 12, two contact holes 171,172 in the source electrode region and one contact hole 173 on the metal pattern 163 are formed by patterning the passivation layer. Contact holes 173,174 are also formed at the end of each data line 160 and gate line 110, i.e. at each data pad and gate pad.

In case of forming the passivation layer with organic insulator, at the surface of passivation layer, embossment can be made to be micro lens which integrates reflected light or transmitting light. And, if the passivation layer is photosensitive, patterning the passivation layer can be executed by only photolithography process and one etching step can be omitted.

Over the passivation layer, transparent conduction layer such as ITO, IZO is deposited and patterned to form a transmissive pixel electrode which is connected to the source electrode 162 through one contact hole 171. The transmissive pixel electrode 180 is preferably made small enough to cover only the transmissive area. The transmissive pixel electrode 180 is also connected with the metal pattern 163 through the contact hole 173 formed on the capacitor line 111 to be a kind of capacitor electrode. Also, the transparent conduction layer can be remained on the pad area where the remained transparent conduction layer act as subsidiary pad. On the transmissive pixel electrode 180, a separating insulator made with silicon nitride or organic insulator is formed. To reveal the source electrode 162 through the other contact hole 172, the separating insulator and the transmissive pixel electrode 180 have hole in them. Then, the reflective pixel electrode 200 formed on the separation insulator is connected with the source electrode 162 through the other contact hole 172. The reflective pixel electrode 200 can be made with aluminum containing metal or silver containing metal and patterned to form reflective area which covers the whole pixel region except for the transparent area. The reflective area can be formed over the gate line 110 or the data line 160 to enlarge the whole pixel area.

Generally, the micro lens for integrating light can be made at the surface of passivation layer by forming embossments at the surface. If the separating insulator is formed with organic material, preferably with photo sensitive material like polyimide, the micro lens can also be made at the surface of the separating insulator in place of the passivation layer. And, in place of the transmissive pixel electrode 180, the reflective pixel electrode 200 can be connected to metal pattern 163 to become a capacitor electrode. It is obvious to those skilled in the are that, to the embodiment 1~3, the above description can be easily applied by mere change of contact between the source electrode and the pixel electrodes.

(Embodiment 5)

Figure 14A:
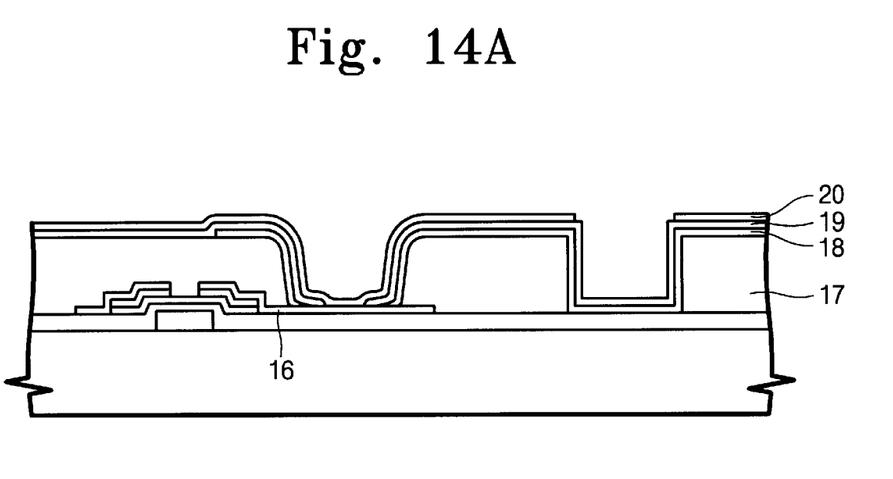
FIG. 14a shows a cross sectional view of other different example of the aspect of the present invention.
Figure 14B:
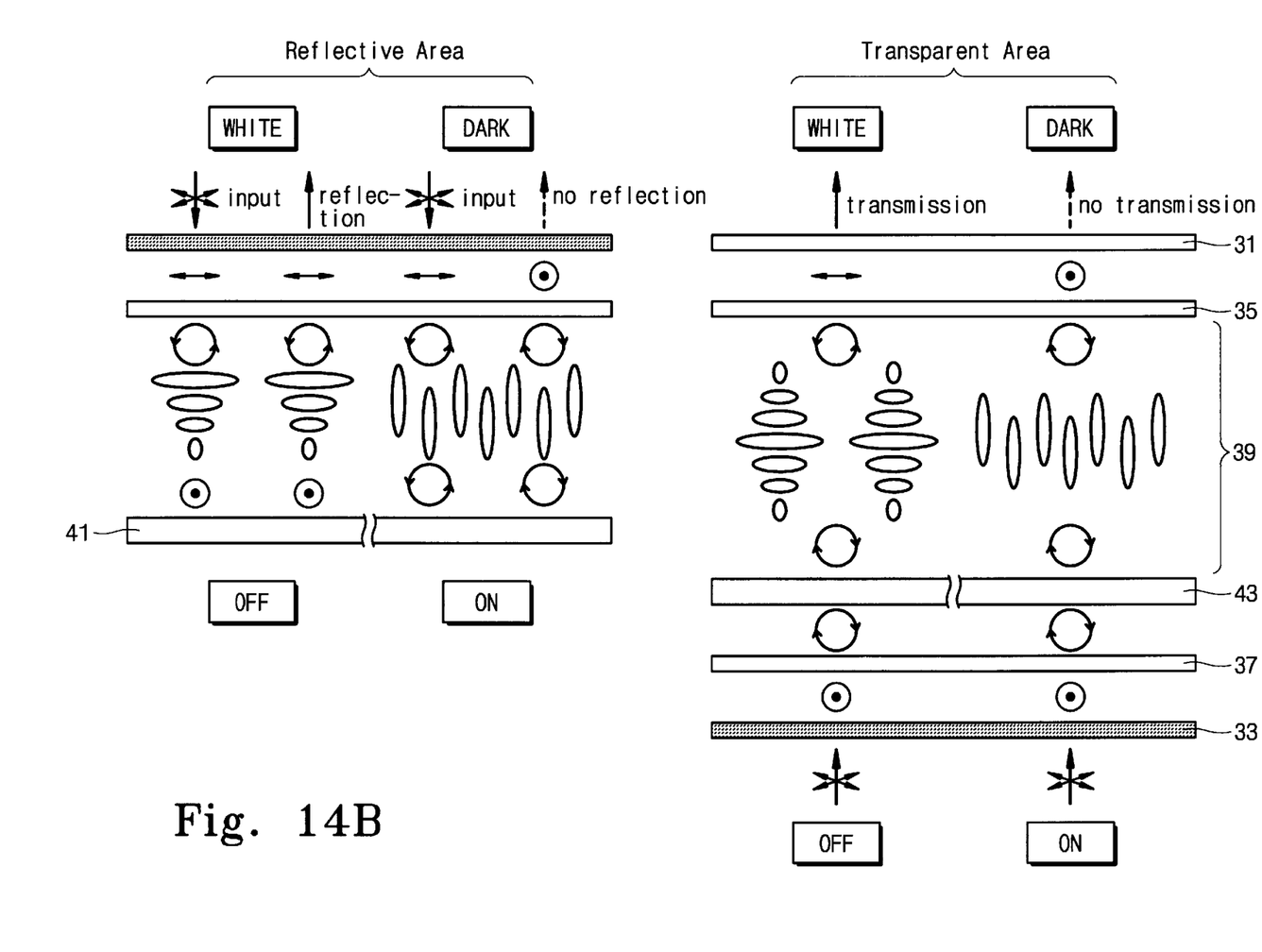
FIG. 14b shows a cross sectional view schematically presenting the phase change of light in an example of the present invention.

FIG. 14a shows a different type of embodiment of the present invention. A source electrode 16 is formed wide on the substrate in the structure of the bottom gate type thin film transistor. A passivation layer 17 is formed on the substrate including the source electrode 16. A pixel electrode is formed on the passivation layer 17. The pixel electrode comprises a transmissive pixel electrode 18, a separating insulator 19 and a reflective pixel electrode 20. Both the transmissive and the reflective pixel electrode 18,20 are individually connected to the source electrode 16 through a contact hole formed in the passivation layer 17. The separating insulator 19 is formed to prevent the problems caused by the direct connection of the transmissive pixel electrode 18 and the reflective pixel electrode 20. In the middle of a pixel area, there is a transparent area made by removing the reflective conduction layer. In the transparent area, there is a window formed by patterning the passivation layer 17. The window in the passivation layer is formed to improve the brightness of LCD. Generally, for the maximum brightness, the Δnd of liquid crystal layer in reflective type LCD correspond to a quarter of wavelength of light and the Δnd of liquid crystal layer in transmissive type LCD correspond to half of the wavelength of light. So, if the crystal layer has same thickness over the whole pixel area in a reflective-transmission type LCD like embodiment 4, the transmissive pixel area or the reflective pixel area cannot be in the state of maximum brightness in bright mood. Thus, by differentiating the thickness of liquid crystal layer in transmissive region from that in reflective area, the state of polarized light can be matched in phase with the polarizer film placed at the front side of LCD in bright mood. And at least the brightness of LCD can be improved by partial removal of the mismatch in phase. And, considering the above described, the thickness of passivation layer preferably is equal to the thickness of the liquid crystal layer in reflective pixel area. In FIG. 14b, the above explanation is digested.

(Embodiment 6)

Figure 15:
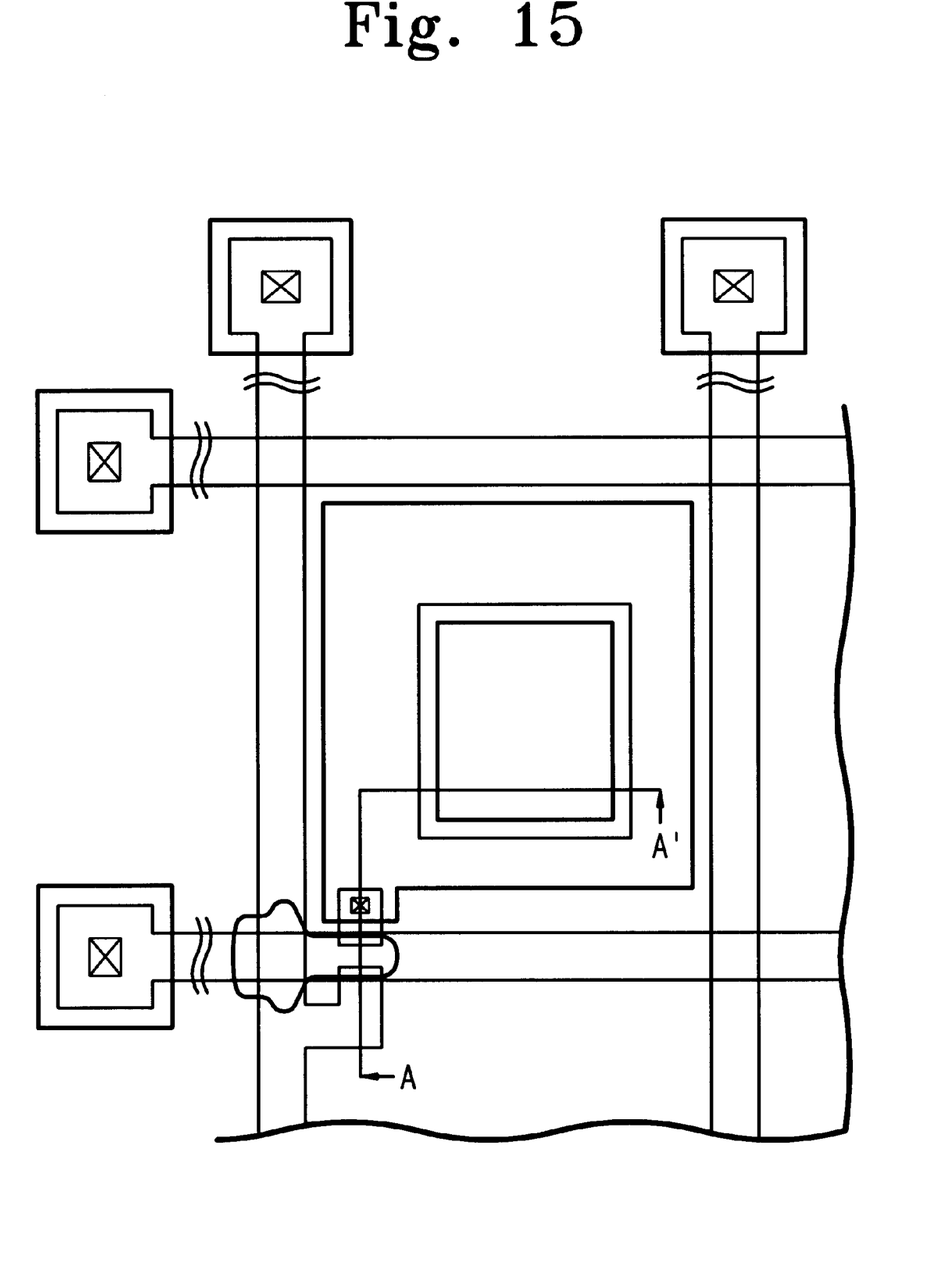
FIG. 15 shows the planar view of an example of the other aspect of the present invention.

FIG. 15 shows a planar view of pixel area and pad area in an embodiment of the other aspect of the present invention. The sequence of forming reflective pixel electrode and forming transmissive pixel electrode can be exchanged. Along the peripheral part of transparent area, a reflective pixel electrode and a transmissive pixel electrode are connected each other by a parameter metal layer.

Figure 16:
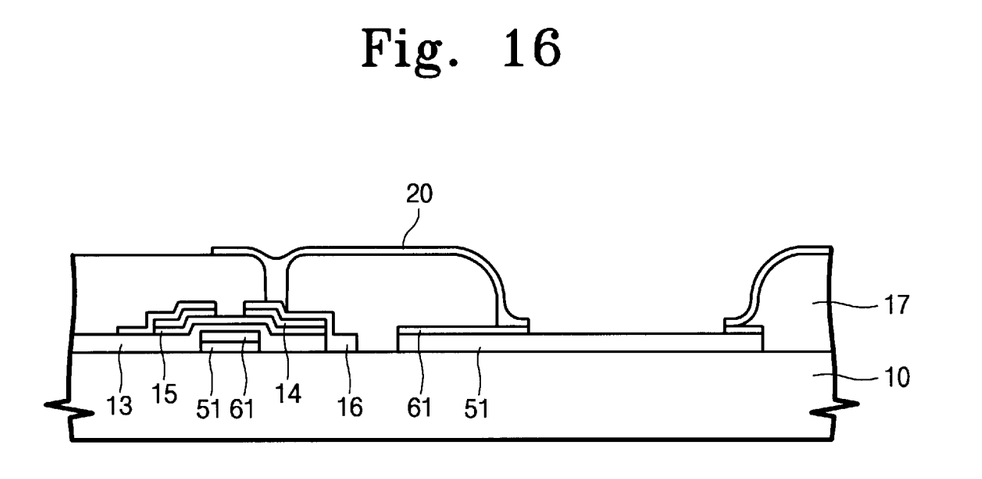
FIG. 16 shows the cross sectional view of the example of FIG. 15 according to the cut line AA'.

FIG. 16 shows a cross sectional view of the embodiment shown in FIG. 15 along the line AA'. To form the structure, first, transparent layer 51 and chromium layer 61 are made on the glass substrate 10 and patterned to form gate electrode, gate line, gate pad and transparent layer containing pixel electrode. The transparent conduction layer 51 can be physically deposited by sputtering ITO or IZO material, and the chromium layer 61 can also be formed by sputtering. The transparent layer containing pixel electrode is electrically separated with the gate electrode. The gate insulation layer 13 made with silicon oxide or silicon nitride is formed by CVD (chemical vapor deposition) method and patterned to cover the gate electrode and gate line. But the gate insulation layer is removed on the transparent layer containing pixel electrode. Amorphous silicon active layer 15 and impurity doped amorphous silicon ohmmic contact layer 14 are deposited and patterned to form active region. The active region can be divided into source, drain and channel region. Then, the drain electrode, the source electrode 16 and data line and data pad are formed by forming metal layer and patterning the metal layer. Ohmmic contact layer is etched by using the metal layer pattern like the source/drain electrode as an etching mask to make the channel operated properly. A passivation layer 17 made with organic insulator is formed over the source/drain electrode and patterned to form a contact hole revealing a part of the source electrode 16 and a window. The window reveals the most part of the transparent layer containing pixel electrode including a transparent area and the neighboring part of the transparent area.

The thickness of passivation layer 17 may preferably be equal to the thickness of the liquid crystal layer in reflective pixel area with no regard to the direction of robbing, the tilt angle and other variables of LCD.

And the. surface of the passivation layer 17 may has embossment to form micro lenses to integrate light. Then, the reflective conduction layer including aluminum is formed over the passivation layer 17 and patterned to define the transparent area and to form reflective pixel electrode 20 which is connected to the source electrode 16 through the contact hole.

After the patterning the reflective conduction layer, the chromium layer 61, the upper layer of the transparent layer containing pixel electrode is removed by using the reflective pixel electrode 20 as an etching mask. Thus, the transparent conduction layer 51 in the transparent layer containing pixel electrode are indirectly connected at the neighboring part of the transparent area with the reflective pixel electrode 20 by the parameter chromium layer 61 and also electrically connected with the source electrode 16 by the reflective pixel electrode 20.

In the above embodiment, transparent layer containing pixel electrode may be formed with the source electrode in place of the gate electrode or may be formed with the same kind of double layers at a different step after the forming of the source electrode. So, if the transparent layer containing pixel electrode is formed with the source electrode in place of the gate electrode, gate electrode may be made with aluminum, the source/drain electrode layer may be made with transparent layer and chromium, and the reflective pixel electrode may be made with chromium or aluminum.

(Embodiment 7)

Figure 17:
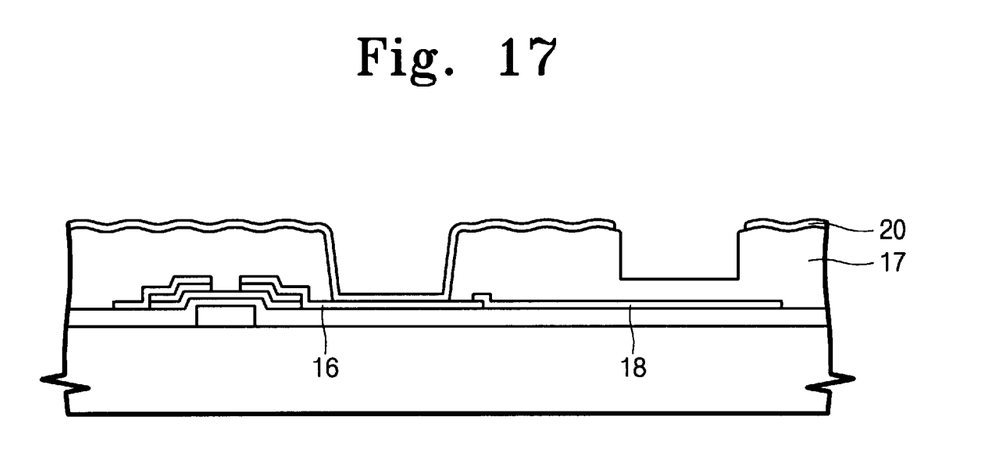
FIG. 17 to FIG. 19 are cross sectional views of different examples of the other aspects of the present invention.

FIG. 17 shows a cross sectional view of a different embodiment of the present invention. Here, a part of thickness of a passivation layer 17 is remained in the transparent area. Whole pixel electrode comprises a transmissive pixel electrode 20 which is connected to a source electrode 16 with no connection through a contact hole. The whole pixel electrode also comprises a reflective pixel electrode 20 which is separated at the most part by passivation layer 20 and connected through a contact hole with the source electrode 16. Of course, the reflective conduction layer is removed in the transparent area so that the light generated from a backlight can be transmitted to the front side of LCD and the passivation layer should be transparent.

(Embodiment 8)

Figure 18:
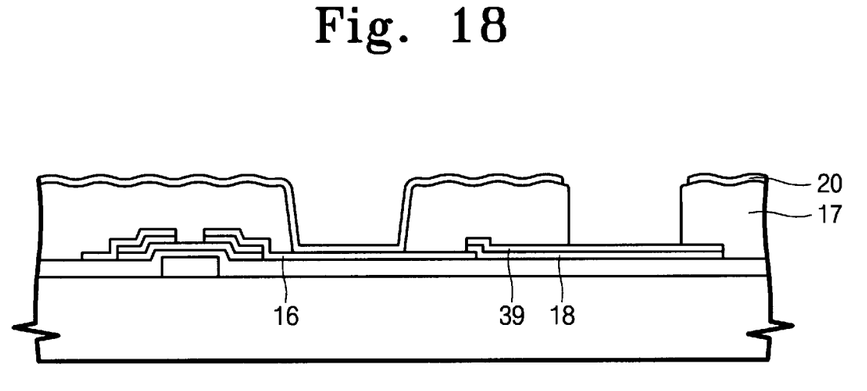

FIG. 18 shows a cross sectional view of an embodiment which can compensate the shortness of the embodiment shown in FIG. 17. In the embodiment shown in FIG. 17, it is difficult to remove the partial thickness of the passivation layer 17 in the transparent region in the process of patterning the passivation layer 17 to form a contact hole at some part of the source electrode region. But, in this embodiment, the passivation layer 17 is removed thoroughly in the transparent area and the transmissive pixel electrode 18 has covering 39. Here, The transmissive pixel electrode 18 including the covering 39 is formed by depositing a covering layer made with silicon oxide or silicon nitride on the transparent conduction layer and patterning the covering layer and the transparent conduction layer with an etching mask. By the covering 39, the transparent conduction layer like ITO can be separated with the reflective conduction layer like aluminum in the process of fabrication.

(Embodiment 9)

Figure 19:
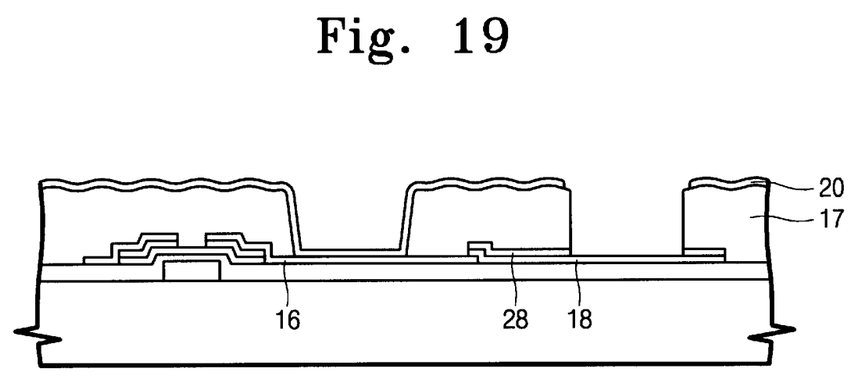

According to FIG. 19, a transparent layer made with ITO and a metal layer are formed over a source electrode 16 and patterned to form a transparent layer containing pixel electrode. Then a passivation layer 17 is formed over the transparent layer containing. pixel electrode. The passivation layer 17 is patterned to form a contact hole at a part of the source electrode 16 and to form a window revealing some part of the transparent layer containing pixel electrode. And, a reflective conduction layer made of aluminum is formed on the passivation layer 17 and patterned to define a reflective area. In the patterning of the reflective conduction layer, the reflective conduction layer is removed in the transparent area to reveal the transparent layer containing pixel electrode. Then, the upper layer of the transparent layer containing pixel electrode, the metal layer 28 is removed by using the reflective pixel electrode 20 as an etching mask. Compared with the embodiment shown in FIG. 18, the embodiment shown in FIG. 19 have a different covering for transmissive pixel electrode 18. The covering, the metal layer 28 is made of metal which can act as a buffer layer between the transparent conduction layer and the reflective conduction layer. And, finally, the covering is to be removed in the transparent area.

Compared with the embodiment 6 where the transparent layer containing pixel electrode is formed with the same layer for gate elctrode, the transparent layer containing pixel electrode (made with transparent conduction layer and the covering layer) of the present embodiment is formed concurrently with the same layers for the source electrode in place of the gate electrode or may be formed with the same kind of double layers at a different step after the forming of the source electrode. Then, the covering layer preferably is made with materials of good conductivity, metal, like chromium, titanium for the signal transmission of data line which is concurrently formed with the source electrode or the transparent layer containing pixel electrode.

The above mentioned embodiments are all related with amorphous silicon type and bottom gate type TFT LCD, but the concept of the present invention can also be applied to polycrystalline silicon type or top gate type TFT LCDs.

What is claimed is:

1. A reflective transmission type thin film transistor liquid crystal display (TFT LCD) comprising:
   a substrate;
   a thin film transistor formed on said substrate and including a source electrode;
   a passivation layer formed over said substrate and having a first contact hole exposing the source electrode;
   a transmissive pixel electrode formed on the passivation layer and connected to a source electrode of the source region through a contact hole;
   a reflective pixel electrode formed on the passivation layer and connected to the source electrode of the source region through a contact hole; and
   a buffer layer formed between the transmissive pixel electrode and the reflective pixel electrode
   wherein a pixel area of the TFT LCD has a transparent area excluding the reflective pixel electrode and a reflective area including the reflective pixel electrode.

2. The reflective transmission type thin film transistor liquid crystal display of claim 1, wherein each of said transmissive pixel electrode and the reflective pixel electrode is in direct contact with the source electrode.

3. The reflective transmission type thin film transistor liquid crystal display of claim 1, wherein the transmissive pixel electrode and the buffer layer have a hole exposing a portion of the source electrode, and
   the reflective pixel electrode is formed over the transmissive pixel electrode and the buffer layer, and connected to the exposed portion of the source electrode via the hole.

4. The reflective transmission type thin film transistor liquid crystal display of claim 1, further comprising a second contact hole formed through the buffer layer, the transmissive pixel electrode and said passivation layer to expose the source electrode,
   wherein the transmissive pixel electrode is connected to the source electrode via the first contact hole and the reflective pixel electrode is connected to the source electrode via the second contact hole.

5. The reflective transmission type thin film transistor liquid crystal display of claim 1, wherein the transmissive pixel electrode and the buffer layer have a hole exposing a portion of the source electrode, and
   the reflective pixel electrode is formed over the transmissive pixel electrode and connected to the exposed portion of the source electrode via the hole.

6. The reflective transmission type thin film transistor liquid crystal display of claim 1, wherein the reflective pixel electrode has a hole exposing a portion of the source region, and
   the transmissive pixel electrode, formed over the reflective pixel electrode connected to the exposed portion of the source electrode via the hole.

7. The reflective transmission type thin film transistor liquid crystal display of claim 6, further comprising a separating insulator formed between the transmissive pixel electrode and the reflective pixel electrode.

8. The reflective transmission type thin film transistor liquid crystal display of claim 1, wherein the reflective pixel electrode comprising a metal including aluminum, and the transmissive pixel electrode comprising indium metal oxide lineage.

9. The reflective transmission type thin film transistor liquid crystal display of claim 1, wherein the transparent area is in the shape of a window surrounded by the reflective area.

10. The reflective transmission type thin film transistor liquid crystal display of claim 9, wherein the buffer layer is not formed in the transparent area.

11. The reflective transmission type thin film transistor liquid crystal display of claim 1, wherein the passivation layer comprises photosensitive transparent insulator, and a surface of the passivation layer has embossment.

12. A reflective transmission type thin film transistor liquid crystal display (TFT LCD) comprising:
   a substrate;
   a thin film transistor formed on the substrate;
   a first pixel electrode comprising:
      a non-oxidizing metal layer of which a portion removed in a transparent window region, and
      a transparent conductor layer underlying the non-oxidizing metal layer;
   a passivation layer formed over the thin film transistor and the first pixel electrodes and having a contact hole exposing a source electrode of said thin film transistor and a hole exposing the transparent window; and a second pixel electrode formed over said passivation layer, patterned to expose the transparent window region, and connected to the source electrode through the contact hole and connected to the non-oxidizing metal layer through the hole.

13. The reflective transmission type thin film transistor liquid crystal display of claim 12, wherein the passivation layer comprises photosensitive transparent insulator.

14. The reflective transmission type thin film transistor liquid crystal display of claim 13, wherein a portion of a surface of said passivation layer has embossment.

15. The reflective transmission type thin film transistor liquid crystal display of claim 12, wherein a thickness of the passivation layer corresponds to a quarter of a wavelength of light in liquid crystal.

16. The reflective transmission type thin film transistor liquid crystal display of claim 12, wherein the non-oxidizing metal is Cr or MoW.

17. A method for manufacturing a liquid crystal display, comprising the steps of:
    forming a gate wire formed on a substrate, said gate wire comprising a gate pad, a gate line and a gate electrode;
    forming a gate insulating layer on the gate wire;
    forming a data wire formed on the gate insulating layer, said data wire comprising a data pad, a data line, a source electrode and a drain electrode;
    forming a transparent pixel electrode simultaneously with a subsidiary gate pad or a subsidiary data pad; and
    forming a reflective pixel electrode,
        wherein the transparent pixel electrode and the reflective pixel electrode are electrically connected to said source electrode.

18. The method of claim 17, further comprising the steps of: forming a passivation layer to cover the gate insulating layer and the data wire; and
    patterning the passivation layer to expose the source electrode and the gate pad or the data pad.

19. The method of claim 18, wherein the transparent pixel electrode and the reflective pixel electrode are electrically connected to said source electrode via a contact hole formed in the passivation layer.

20. The method of claim 17, wherein the transparent pixel electrode is indium tin oxide (ITO) or indium zinc oxide (IZO).

21. A liquid crystal display, comprising:
    a substrate;
    a gate wire formed on said substrate and comprising a gate pad, a gate line and a gate electrode;
    a gate subsidiary pad formed on the gate pad
    a data wire formed on said substrate, intersecting said gate wire and comprising a data pad, a data line a nd a source electrode and a drain electrode;
    a data subsidiary pad formed on the data pad;
    a passivation layer formed over said substrate;
    a transparent pixel electrode formed on said passivation layer and electrically connected to the source electrode; and
    a reflective pixel electrode formed on said passivation layer and electrically connected to the source electrode,
        wherein said transparent pixel electrode is formed with the same material with said gate subsidiary pad or said data subsidiary pad.

22. The liquid crystal device of claim 21, wherein the transparent pixel electrode is indium tin oxide (ITO) or indium zinc oxide (IZO).

23. A liquid crystal display, comprising:
    a gate electrode formed on a substrate;
    a gate insulation film covering said gate electrode;
    a source electrode and a drain electrode formed on said gate insulating film;
    a passivation layer covering said source electrode and said drain electrode;
    a transmissive pixel electrode electrically connected to said source electrode;
    a reflective pixel electrode electrically connected to said source electrode; and
    a buffer layer formed between said transmissive pixel electrode and said reflective pixel electrode,
        wherein said buffer layer is refractory metal or silicon nitride.

24. The liquid crystal display of claim 23, wherein said transmissive pixel electrode and said reflective pixel electrode are formed on the passivation layer and electrically connected to said source electrode via a contact hole formed in the passivation layer.

25. The liquid crystal display of claim 24, wherein said buffer layer is silicon nitride.

26. The liquid crystal display of claim 23, wherein said passivation layer covers sated buffer layer and said transmissive pixel electrode, and said reflective pixel electrode is formed on the passivation layer and electrically connected to said source electrode via a contact hole formed in the passivation layer.

27. The liquid crystal display of claim 26, further comprising a window formed through the passivation layer and said buffer layer to expose said transmissive pixel electrode.

28. The liquid crystal display of claim 26, wherein said buffer layer is Cr or MoW.

29. A liquid crystal display, comprising:
    a gate electrode and a capacitor line formed on a substrate;
    a gate insulating layer formed on said gate electrode and said capacitor line;
    a source electrode, a data electrode and a capacitor electrode formed on the gate insulating layer, wherein said capacitor electrode is electrically connected to said capacitor line via a contact hole formed in said gate insulating layer;
    a passivation layer covering said source electrode, said data electrode and said capacitor electrode;
    a transparent pixel electrode formed on said passivation layer and electrically connected to said source electrode; and
    a reflective pixel electrode formed on said passivation layer and electrically connected to said source electrode.

30. The liquid crystal display of claim 29, wherein said transparent pixel electrode overlaps said capacitor electrode.

31. A method for manufacturing a liquid crystal device, comprising the steps of:
    forming a gate electrode on a substrate;
    forming a gate insulating film covering the gate electrode;
    forming a source electrode and a drain electrode on the gate insulating layer;
    forming a transmissive pixel electrode on the gate insulating layer;
    forming a passivation layer to cover the source electrode, the drain electrode and the transmissive pixel electrode; and
    patterning the passivation layer to form a window exposing the transmissive pixel electrode.

32. The liquid crystal display of claim 31, further comprising the step of forming a reflective pixel electrode on the passivation layer, wherein the step of patterning the passivation layer comprises the step of patterning the reflective pixel electrode.

33. The method of claim 31, wherein the transmissive pixel electrode covers a portion of the source electrode.

34. The method of claim 31, further comprising the step of forming a buffer layer on the transmissive pixel electrode.

35. The method of claim 34, wherein the step of patterning the passivation layer comprises the step of patterning the buffer layer to expose the transmissive pixel electrode.

36. The method of claim 35, wherein the buffer layer is metal.

37. The method of claim 31, wherein the step of forming the transmissive pixel electrode comprises the steps of:

forming the transmissive pixel electrode on the gate insulating layer; and forming a buffer layer on the transmissive pixel electrode.

38. The method of claim 37, wherein the buffer layer is formed after forming the transmissive pixel electrode but before forming the passivation layer.

39. The method of claim 37, wherein the buffer layer is silicon oxide or silicon nitride.

40. A method for manufacturing a liquid crystal display, comprising the steps of:

forming a gate electrode on a substrate;

forming a gate insulating film covering the gate electrode;

forming a transmissive pixel electrode on the substrate;

forming a source electrode and a drain electrode over the gate insulating film;

forming a passivation layer covering the source electrode, the drain electrode and the transmissive pixel electrode; and forming a reflective pixel electrode on the passivation layer.

41. The method of claim 40, further comprising the step of patterning the passivation layer to form a window exposing the transmissive pixel electrode.

42. The method of claim 40, further comprising the step of forming a buffer layer on the transparent pixel electrode.

43. A method for manufacturing a liquid crystal display, comprising the steps of:

forming a transistor on a substrate;

forming a passivation layer on the substrate and the transistor;

forming a reflective pixel electrode on the passivation layer; and forming a transmissive pixel electrode on the reflective pixel electrode.

44. The method of claim 43, further comprising the step of forming an opening in the reflective pixel electrode prior to forming the transmissive pixel electrode.

45. The method of claim 44, wherein the transmissive pixel electrode covers the opening.

46. The method of claim 43, further comprising the step of patterning the passivation layer to form a contact hole exposing a source electrode of the transistor, wherein the reflective pixel electrode and the transmissive pixel electrode are electrically connected to the source electrode through the contact hole.

47. The method of claim 43, wherein the transmissive pixel electrode is indium zinc oxide or indium tin oxide.

48. A liquid crystal display, comprising:

a substrate;

a transistor formed on the substrate;

a passivation layer covering said substrate and said transistor;

a reflective pixel electrode formed on the passivation layer; and a transmissive pixel electrode formed on the reflective pixel electrode.

49. The liquid crystal display of claim 48, further comprising an opening formed in said reflective pixel electrode.

50. The liquid crystal display of claim 49, wherein said transmissive pixel electrode covers the opening.

51. The liquid crystal display of claim 48, further comprising a contact hole formed in the passivation layer to expose a source electrode of said transistor, wherein said reflective pixel electrode and said transmissive pixel electrode are electrically connected to the source electrode through the contact hole.

52. The liquid crystal display of claim 48, wherein said transmissive pixel electrode is indium zinc oxide or indium tin oxide.

* * * * *

UNITED STATES PATENT AND TRADEMARK OFFICE
CERTIFICATE OF CORRECTION

PATENT NO. : 6,683,666 B1
DATED : January 27, 2004
INVENTOR(S) : Yong-Kyu Jang et al.

It is certified that error appears in the above-identified patent and that said Letters Patent is hereby corrected as shown below:

<u>Column 10,</u>
Line 32, change "electrode, formed" to -- electrode is formed --.
Line 65, change "electrodes" to -- electrode, --.

<u>Column 11,</u>
Line 52, change "a nd a" to -- and a --.

<u>Column 12,</u>
Line 25, change "sated" to -- said --.

Signed and Sealed this

Thirtieth Day of March, 2004

JON W. DUDAS
*Acting Director of the United States Patent and Trademark Office*